Aug. 25, 1959  D. MOST  2,901,671
CONTROLLED FLASH LAMP POWER SUPPLY
Filed April 5, 1956  2 Sheets-Sheet 1
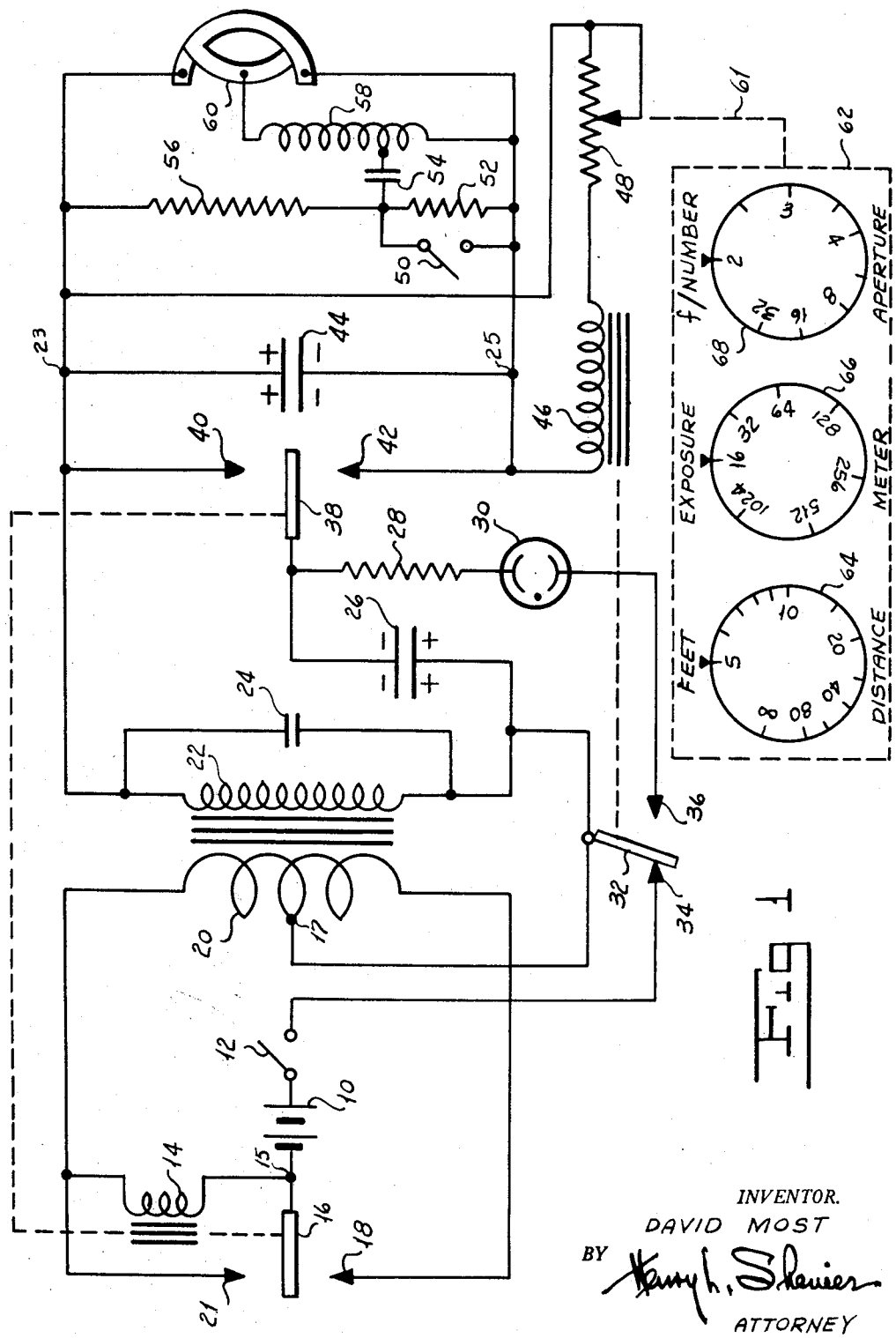
INVENTOR.
DAVID MOST
BY Harry I. Sheuier
ATTORNEY

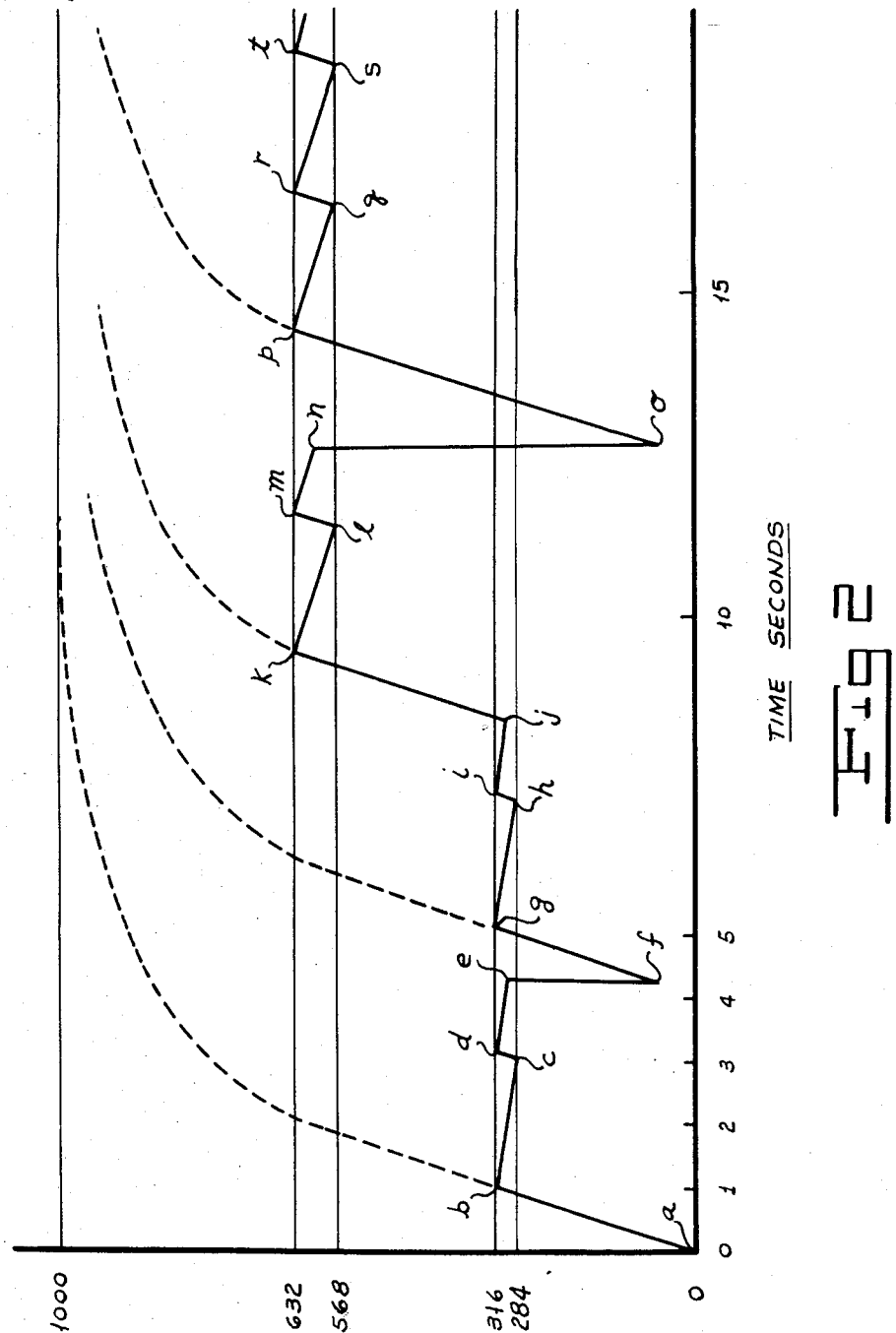

United States Patent Office 2,901,671
Patented Aug. 25, 1959

2,901,671

CONTROLLED FLASH LAMP POWER SUPPLY

David Most, Brooklyn, N.Y., assignor to ACR Electronics Corporation, New York, N.Y., a corporation of New York Application April 5, 1956, Serial No. 576,467

12 Claims. (Cl. 315—219)

My invention relates to controlled flash lamp power supplies and more particularly to portable power regulated supplies of adjustable voltage output.

In portable power supplies of the prior art a battery and a vibrator are usually employed to generate an alternating current, which is stepped up by a transformer and rectified to charge a storage capacitor. A mechanical vibrator is allowed to operate continuously, and the voltage output across the storage capacitor will gradually decrease as the battery becomes exhausted. In addition, after the storage capacitor has been discharged, as for example in the operation of a photoflash tube, an exceedingly long time is required for the voltage across the storage capacitor to be restored to its asymptotic value. When the final voltage is merly a function of the impedance of the excitation source and of the losses in the circuit, the final voltage is approached very slowly and consequently the time which is required to charge to this final voltage will be very long. Furthermore, since the vibrator of the prior art operates continuously, there will be mechanical losses in the vibrator and transformer losses during this idling period. These losses are significant because the idling time may be as long as several minutes while the charging time is only of the order of a few seconds. A battery will be exhausted much sooner if required to supply these idling losses. Furthermore, in portable power supplies of the prior art there is no means of adjusting the voltage. For photoflash applications in conjunction with a camera it was, consequently, necessary to adjust the distance between camera and subject and to adjust the aperture or lens opening to conform to the constant amount of light available from a photoflash tube energized by a power supply of the prior art.

One object of my invention is to provide a portable regulated power supply for a photoflash tube to be employed in conjunction with a camera where the voltage is adjustable and is controlled as a function of the camera-to-subject distance and as a function of the lens aperture so that the proper amount of light is automatically produced.

Another object of my invention is to provide a portable regulated power supply in which there are no idling losses of the vibrator and step-up transformer, and hence to provide a power supply in which the life of the battery is correspondingly increased.

A further object of my invention is to provide a portable regulated power supply in which the time required for recharging is much shorter than in power supplies of the prior art.

Other and further objects of my invention will appear from the following description.

In general, my invention contemplates the provision of a conventional battery-excited power supply having a pair of relay contacts in series with the battery. A relay winding senses the voltage across the storage capacitor and opens the contacts when the voltage rises to an upper limit and closes the contacts when the voltage drops to a lower limit. A resistor is provided in series with the relay winding; and by varying the resistance of the resistor, the output voltage may be adjusted. Conveniently, the resistance is varied simultaneously with the operation of the range-finding and lens aperture camera controls.

In the accompanying drawings which form part of the instant specification and which are to be read in conjunction therewith and in which like reference numerals are used to indicate like parts in the various views:

Figure 1 is a schematic view of a controlled flash lamp power supply showing one embodiment of my invention.

Figure 2 is a plot of voltage against time for a typical sequence of operation of the controlled flash lamp power supply of my invention.

More particularly referring now to Figure 1, a source of direct current potential, such as input battery 10, has its positive terminal connected to relay contact 34 through starting switch 12. The armature of the relay is connected to a center tap of a primary winding 20 of a step-up transformer. The terminals of primary winding 20 are connected, respectively, to vibrator contacts 18 and 21. Contact 21 is connected through vibrator winding 14 to the armature 16 of the vibrator, which, in turn, is connected to the negative terminal of battery 10. The secondary winding 22 of the step-up transformer is shunted by a buffer capacitor 24 to prevent arcing at the contacts. One terminal of secondary winding 22 is connected to one contact 40 of a second pair of vibrator contacts 40 and 42. The other terminal of secondary winding 22 is connected to the relay armature 32 and through a voltage doubling capacitor 26 to an armature 38 disposed to engage contacts 40 and 42. Armatures 16 and 38 are operated in synchronism by vibrator winding 14. Contacts 40 and 42 are connected by an output storage capacitor 44 which is shunted by a rheostat 48 in series with a current-sensitive relay 46. Armature 38 is connected through current-limiting resistor 28 and glow discharge tube 30 to a contact 36, forming in conjunction with contact 34 and arm 32 a single-pole, double-throw relay contact. Shunting storage capacitor 44 are voltage dividing resistors 56 and 52 in series. The junction of resistors 56 and 52 is connected through a shutter control switch 50 to contact 42 so as to shunt resistor 52 when switch 50 is closed. The junction of resistors 56 and 52 is also connected through a coupling capacitor 54 to a tap on an autotransformer 58, one terminal of which is connected to contact 42 and the other terminal of which is connected to a starting electrode of a flash lamp 60. The main electrodes of flash lamp 60 are connected across storage capacitor 44.

In operation and referring now to both Figures 1 and 2, starting switch 12 is closed at point $a$ on Figure 2 when both voltage and time are zero. Current flowing through half of primary winding 20 and through winding 14 causes armature 16 to be attracted towards contact 21. It will be observed that the circuit for producing the unidirectional charging pulses is provided with a pair of terminals 15 and 17 across which the battery, the starting switch 12, the relay contact 34 and the relay armature 32 are connected. This charging pulse producing circuit has a pair of output terminals 23 and 25 across which the storage capacitor 44 is connected. In parallel with the storage capacitor 44 I connect in series the variable resistor 48 and the relay winding 46 which controls the armature 32. When armature 16 engages contact 21, load current will flow through that half of primary winding 20. A voltage appears across secondary winding 22. The armature 38 will move in conjunction with armature 16 and engage contact 40, thus charging the doubling capacitor. The engagement of armature 16 with contact 21 short-circuits winding 14 and armatures 16 and 38 swing back to engage, respectively, contacts 18 and 42. Load current now flows through the other half of primary winding 20 producing a voltage of opposite polarity across secondary winding 22 to charge storage capacitor 44 and doubling capacitor 26 in series. The voltage across storage capacitor 44 will rise exponentially from value $a$ to value $b$, at which point the voltage may be 316 volts after a time lapse of one second. Sufficient current will now flow through relay coil 46 to pull relay arm 32 into engagement with contact 36 thereby interrupting the primary circuit and simultaneously shunting glow tube 30 and ballast resistor 28 across doubling capacitor 26, which is charged to half of 316 volts or 158 volts and causes neon tube 30 to break down, providing a visual indication that the circuit is ready for use. The leakage associated with storage capacitor 44 and the currents taken through rheostat 48 and relay winding 46 and through voltage dividing resistors 56 and 52 will cause the storage capacitor to gradually discharge from value $b$ to value $c$ at which point the voltage may be 284 volts. At point $c$ the current through relay winding 46 being reduced causes relay arm 32 to return to engagement with contact 34 to energize the primary circuit. The voltage across capacitor 44 now rises from value $c$ to value $d$ where it is again 316 volts and the current through relay winding 46 being increased again pulls relay arm 32 into engagement with contact 36 to again interrupt the primary circuit and light the glow tube. The limits are then ±5% about an average value of 300 volts. This tolerance is due to relay hysteresis, but may be very small. Capacitor 44 again discharges from value $d$ through the associated circuitry and to value $e$. At this point it is assumed switch 50 is closed as the camera shutter is actuated. The voltage across resistor 52 is thereby reduced to zero and the voltage change is coupled through capacitor 54 to the tap of autotransformer 58. Now increased voltage will appear at the striking electrode of flash tube 60 causing it to partially break down. The establishment of the local arc discharge triggers the main discharge between its terminals which shunt storage capacitor 44. The voltage across capacitor 44 will drop precipitously from value $e$ to value $f$, the extinction voltage of photoflash tube 60. The drop in voltage causes relay arm 32 to engage contact 34, thereby charging storage capacitor 44 from value $f$ to value $g$, at which point the voltage is returned to 316 volts. During the recharging period from voltage $f$ to value $g$, glow tube 30 is extinguished, and at point $g$ relay arm 32 returns to engagement with contact 36, ceasing the charging operation and reestablishing the glow tube circuit from value $g$ to value $h$. The capacitor gradually discharges and from value $h$ to value $i$ is recharged and from point $i$ to some point $j$ is gradually discharged. At point $j$ the operator may have decreased his lens aperture, or he may have increased his distance from camera to subject, or he may have decreased his exposure meter setting, as for example when the light from the sun is interrupted by clouds, or some or all of these. Increased light is required from the photoflash tube. Assume that four times as much light is required from the photoflash tube. The light from the photoflash tube varying substantially as the square of the voltage, the voltage must be approximately doubled to quadruple the light output. The movement of these controls through the mechanical linkage 61 to rheostat 48 doubles the effective resistance of the series circuit including rheostat 48 and relay winding 46 so that twice as much current is required through relay winding 46 to operate the relay. The voltage now rises from value $j$ to value $k$, at which point the voltage will be 632 volts. From point $k$ to point $l$ storage capacitor 44 gradually discharges to 568 volts. From point $l$ to point $m$ it is rapidly recharged. The limits are still ±5%, but now about an average value of 600 volts. From value $m$ the voltage again slowly discharges. At some point $n$ the operator operates the shutter and again closes switch 50, resulting again in the breakdown of flash tube 60 and the discharge of the storage capacitor to point $o$, the extinction voltage. From value $o$ to value $p$ storage capacitor 44 is recharged. The cycle of slow discharge followed by rapid recharge and slow discharge again is repeated from point $p$ to point $q$, from point $q$ to point $r$, from point $r$ to point $s$ and from point $s$ to point $t$. The dotted lines of Figure 2 indicate an exponential charging approaching 1000 volts as a final equilibrium value if the battery circuit remains uninterrupted. The time constant is two seconds since the voltage reached after two seconds is 63.2% of the final equilibrium voltage, and within this range the charging can be considered approximately linear. However, as the voltage exceeds the time-constant voltage of 632 volts, the slope of the charging curve decreases rapidly and the recharging operation takes longer and longer. It will be seen that by charging rapidly towards 1000 volts and stopping at, say, 632 volts, rather than by gradually approaching 632 volts as a final value, the time required for recharging is much shorter.

It will be seen that I have accomplished the objects of my invention. During the idling period from point $b$ to point $c$, point $g$ to point $h$, or point $k$ to point $l$, point $p$ to point $q$ and point $r$ to point $s$, the vibrator is disconnected and there are no mechanical losses or transformer losses. The life of the battery will be therefore increased. The voltage is conveniently adjusted by means of rheostat 48 in conjunction with distance, aperture and exposure meter to provide the proper light output for any combination of these settings, rather than adjusting these settings so as to meet a constant light output. It will be appreciated that by charging toward a higher voltage and stopping the charging at an intermediate point, less time will be required for recharging than if the voltage were merely allowed to exponentially approach the final voltage.

It will be understood that certain features and subcombinations are of utility and may be employed without reference to other features and subcombinations. This is contemplated by and is within the scope of my claims. It is further obvious that various changes may be made in details within the scope of my claims without departing from the spirit of my invention. It is, therefore, to be understood that my invention is not to be limited to the specific details shown and described.

Having thus described my invention, what I claim is:

1. A controlled power supply for a photoflash tube for use with a camera having a camera control including in combination a battery, a storage capacitor, a relay contact, a relay armature, said armature and said contact forming a normally closed switch, a relay winding for actuating the relay armature to open said normally closed switch upon a predetermined current flow through said winding, a resistor, means connecting the relay winding and the resistor in series, means responsive to the actuation of the camera control for varying the resistance of said resistor, a circuit for producing unidirectional output pulses said circuit having a pair of input terminals and a pair of output terminals and including a voltage doubling capacitor and vibrator means and a transformer, means connecting the battery and said relay contact and said relay armature forming said normally closed switch in series across the input terminals, means for connecting the storage capacitor across said output terminals and means for connecting the series-connected relay winding and resistor in parallel with said storage capacitor.

2. A controlled power supply as in claim 1 in which said camera control comprises range-finding means.

3. A controlled power supply as in claim 1 in which said camera control includes light-measuring means.

4. A controlled power suppyl as in claim 1 in which said camera control includes a lens aperture-setting means.

5. A controlled power supply as in claim 1 including in combination indicating means and means for energizing the indicating means by the voltage doubling capacitor.

6. A controlled power supply as in claim 1 including in combination a glow tube, a resistance, a second relay contact adapted to make contact with said armature and means for connecting said resistance, said glow tube, said second contact and said armature across said voltage doubling capacitor.

7. A controlled power supply as in claim 1 in which the vibrator means comprises two synchronous vibrators, in which the transformer has a center-tapped primary input winding and a secondary output winding, and in which the circuit for producing unidirectional output pulses includes means connecting one of the synchronous vibrators to the center-tapped primary input winding and means including the voltage doubling capacitor connecting the other synchronous vibrator to the secondary output winding.

8. A regulated power supply including in combination a source of voltage, current control means, a storage capacitor, voltage-sensitive means for actuating the current control means, means for varying the voltage sensitivity of the actuating means, a circuit for producing unidirectional output pulses, said circuit having two input terminals and two output terminals, means connecting the voltage source and the current control means in series across the input terminals, means connecting the storage capacitor across the output terminals and means connecting the voltage-sensitive actuating means in parallel with said storage capacitor.

9. A power supply as in claim 8 in which the voltage source is a battery.

10. A regulated power supply as in claim 8 in which said current control means includes a normally closed relay switch and in which the voltage-sensitive actuating means comprises a relay winding for opening said switch.

11. A regulated power supply as in claim 8 in which the actuating means comprises a relay winding and a resistor connected in series and in which the means for varying the voltage sensitivity of the actuating means comprises means for varying the resistance of said series resistor.

12. A regulated power supply as in claim 8 in which the circuit for producing unidirectional output pulses includes a step-up transformer having a center-tapped primary input winding and a secondary output winding, two synchronous vibrators, a voltage doubling capacitor, means connecting one of said synchronous vibrators to the center-tapped primary input winding and means including said voltage doubling capacitor connecting the other synchronous vibrator to the secondary output winding.

References Cited in the file of this patent
UNITED STATES PATENTS

| | | |
|---|---|---|
| 1,876,058 | Kayser | Sept. 6, 1932 |
| 1,939,332 | Bouwers | Dec. 12, 1933 |
| 2,178,423 | Inman | Oct. 31, 1939 |
| 2,310,092 | Knowles et al. | Feb. 2, 1943 |
| 2,342,257 | Edgerton | Feb. 22, 1944 |
| 2,358,796 | Edgerton | Sept. 26, 1944 |
| 2,439,860 | Peek | Apr. 20, 1948 |
| 2,449,214 | Gelzer | Sept. 14, 1948 |
| 2,538,577 | McCarty | Jan. 16, 1951 |
| 2,606,308 | Parker | Aug. 5, 1952 |
| 2,622,229 | Lord | Dec. 16, 1952 |
| 2,624,034 | Gelzer | Dec. 30, 1952 |
| 2,724,792 | Nessel | Nov. 22, 1955 |
| 2,755,714 | Germeshausen | July 24, 1956 |
| 2,761,994 | Quitmeyer | Sept. 4, 1956 |
| 2,763,813 | McKinney et al. | Sept. 18, 1956 |